J. M. SCHMITT.
HORSE DETACHER.
APPLICATION FILED MAR. 3, 1908.

907,895.

Patented Dec. 29, 1908.
2 SHEETS—SHEET 1.

Witnesses
Geo. T. Thom
E. L. Chandlee

Inventor
Joseph M. Schmitt
By Woodward & Chandlee
Attorneys

UNITED STATES PATENT OFFICE.

JOSEPH M. SCHMITT, OF KINSLEY, KANSAS.

HORSE-DETACHER.

No. 907,895.   Specification of Letters Patent.   Patented Dec. 29, 1908.

Application filed March 3, 1908. Serial No. 418,961.

*To all whom it may concern:*

Be it known that I, JOSEPH M. SCHMITT, a citizen of the United States, residing at Kinsley, in the county of Edwards and State of Kansas, have invented certain new and useful Improvements in Horse-Detachers, of which the following is a specification.

This invention relates to horse drawn vehicles, and more particularly to draft appliances therefor, and has for its object to provide a means for readily detaching a team of horses from a vehicle while being driven.

Another object is to provide such an article which will be readily operable to release a plurality of horses from a vehicle simultaneously.

Another object is to provide such an article of simple and durable construction which may be manufactured at low cost.

Other objects and advantages will be apparent from the following description, and it will be understood that changes in the specific structure shown and described may be made within the scope of the claim, and that any suitable materials may be used, without departing from the spirit of the invention.

Figure 1:
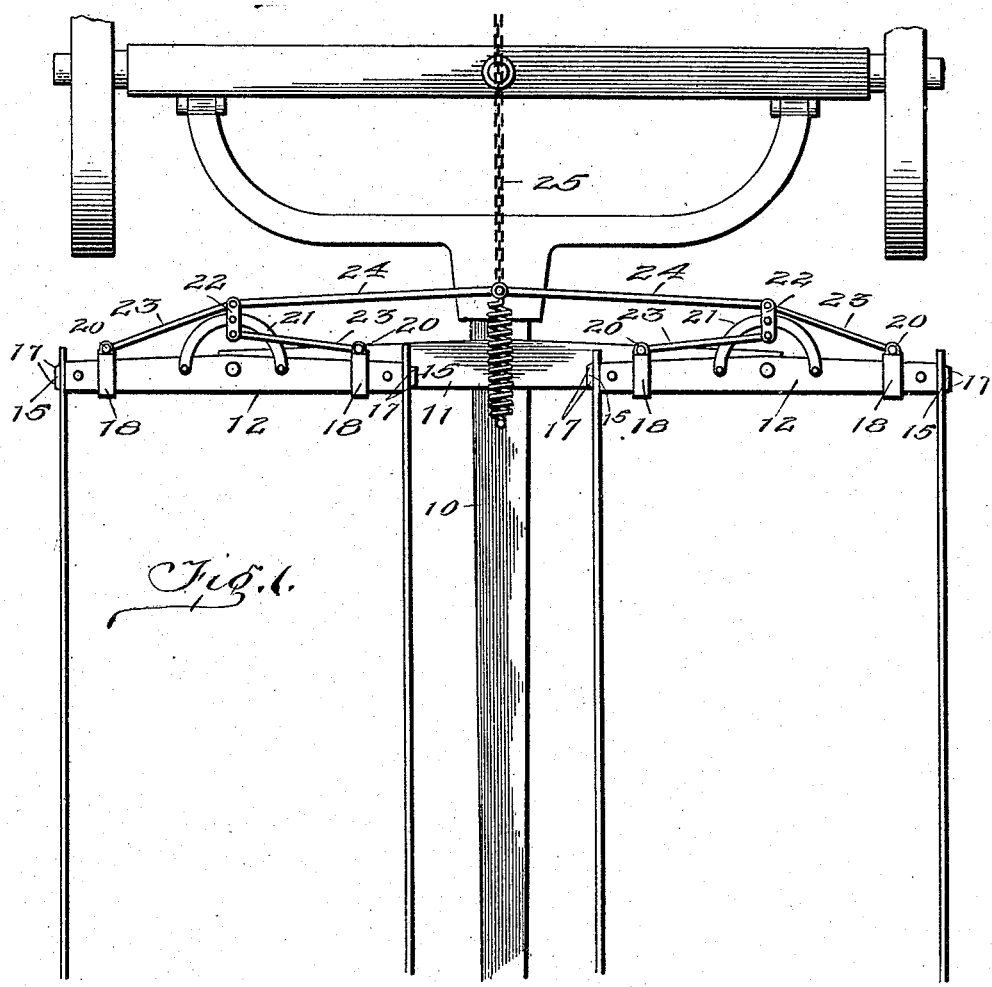
Figure 4:
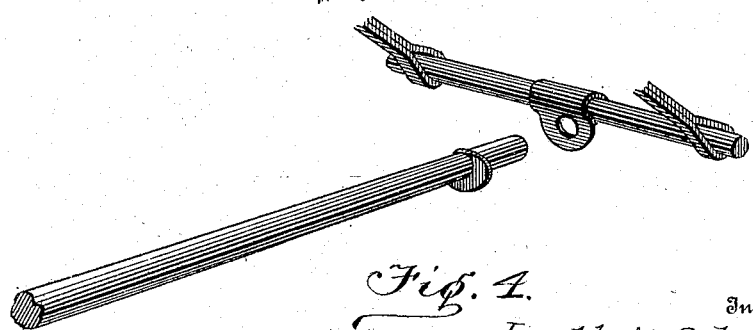
Figure 2:
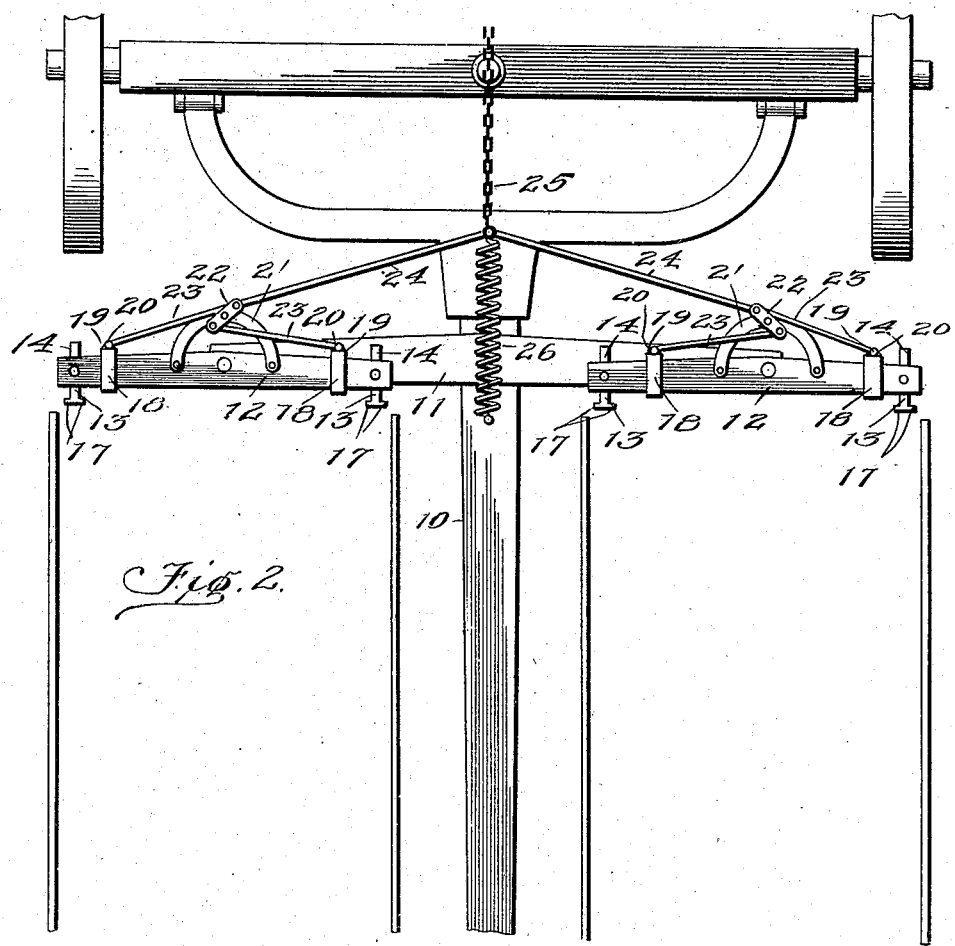
Figure 3:
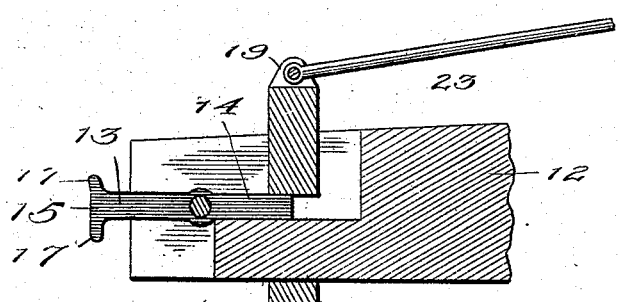

In the drawings forming a portion of this specification and in which like numerals of reference indicate similar parts in the several views:—Figure 1 is a top view of the detacher in engaged position, Fig. 2 is a similar view of the detacher in released position, Fig. 3 is a detailed top view of the trace engaging and releasing portion, and Fig. 4 is a detail of the forward end of a wagon tongue and a neck-yoke suitable for use in conjunction with the present invention.

Referring to the drawings, there is shown a wagon tongue 10 having a double tree 11 pivoted thereon and swingle trees 12 carried by the double tree in the usual manner. At the ends of the swingle trees there are pivoted for horizontal oscillation trace engaging members 13 comprising an inwardly extending latch arm 14 and an outwardly extending engaging arm 15. At the outer extremity of each engaging arm there are horizontally and laterally extending fingers 17 arranged for engagement through a trace eye to retain the trace in position thereon. Retaining sleeves 18 are slidably engaged over the swingle trees at their outer ends, and are arranged to engage over the latch arms to hold the engaging members 13 in engaged position. Rearwardly extending ears 19 are formed on the sleeves 18 and have openings 20 vertically therethrough. Midway of each swingle tree, there is secured a rearwardly extending supporting member 21 having pivoted thereon a beam 22 extending laterally from the swingle tree. Connecting rods 23 are engaged pivotally with the outer ends of the beams 22 and extend oppositely therefrom and engage pivotally with the openings 20 in the ears 19 to operate the sleeves 18 upon the swingle trees 12 when the beams 22 are oscillated. Two rods 24 are secured at their outer ends to the rearwardly extending arms of the beams 22 and extend inwardly in spaced relation with the beams 11 to engage mutually with the end of the chain 25. A helical spring 26 is secured to the inner ends of the rods 24 and is attached to the tongue 10 forwardly thereof to hold the rods yieldably against rearward movement at their inner ends. The chain 25 is arranged to extend to an adjacent vehicle body for operation by being pulled, to operate the releasing means.

It will be seen that a tug on the chain will cause inward tension upon the rear ends of the beams 22 causing rotation thereof and consequent inward movement of the sleeves 18 from engagement over the arms 14 by means of the connecting rod 23.

It will be seen that in use, when a team is hitched to the swingle trees by means of traces engaged over the engaging arms 15, operation of the chain 25 will disengage the sleeves 18 from over the arms 14 and allow the arms 15 to swing forward, the traces being disengaged therefrom by continued forward tension.

It will be understood that for complete detachment o fa double team from a vehicle equipped with this apparatus, a neck-yoke should be used which is arranged for detachment from the tongue when forward strain is applied thereto. A type of neck-yoke suitable for this use is shown in Fig. 4.

What is claimed is:

An article of the class described comprising swingletrees having trace engaging arms pivoted upon their outer ends, said trace engaging arms having integral latch arms extending inwardly in spaced relation with the swingle trees, sleeves slidably engaged upon the swingle trees and arranged to engage over said latch arms to hold the engaging arms in operative position, beams mounted pivotally upon the swingle trees adjacent to their middle portions and extending laterally therefrom, rods carried pivotally at the outer ends of said beams and engaged with said sleeves for sliding operation of the sleeves when the beams are oscillated, rods connected with said beams and extending laterally therefrom to engage pivotally at their inner ends, means for forcing said inner ends of the rods laterally to draw upon the said beams for oscillation thereof, and means for holding said inner ends of the rods yieldably against operation.

In testimony whereof I affix my signature, in presence of two witnesses.

JOSEPH M. SCHMITT.

Witnesses:
F. W. GOLDSCHMIDT,
P. S. CARTER.